Aug. 17, 1926.  
J. KLAUS, FILS  
1,596,860  
PROCEDURE FOR THE MANUFACTURE OF CHOCOLATE  
Filed Jan. 5, 1924
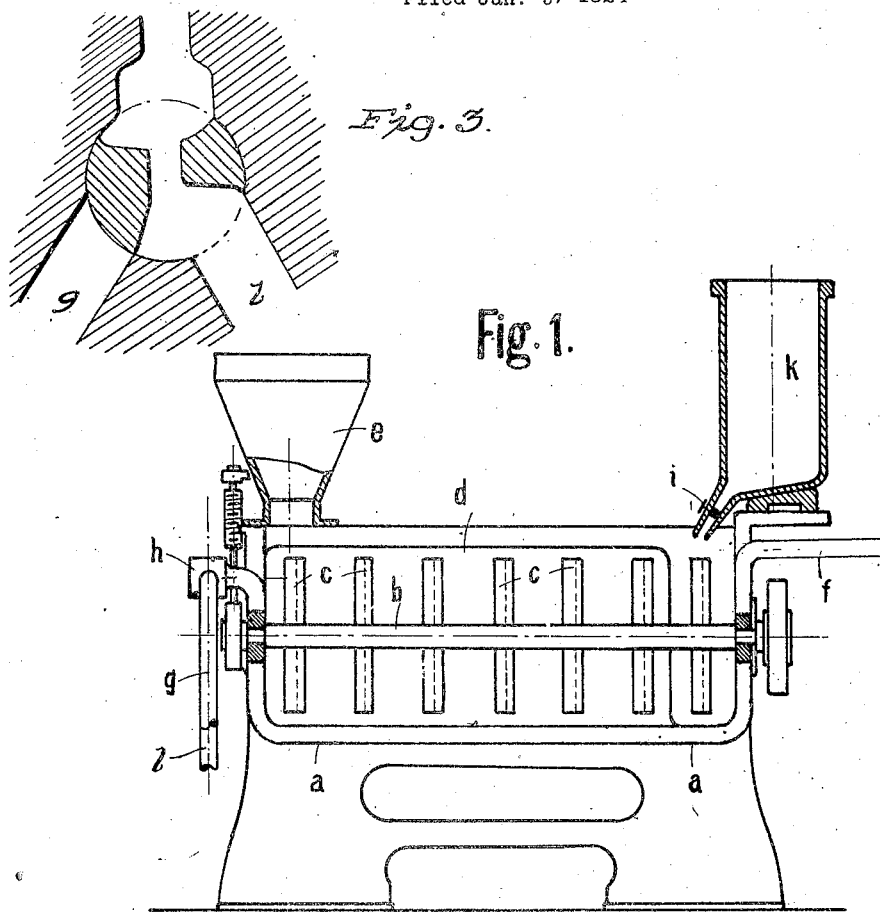
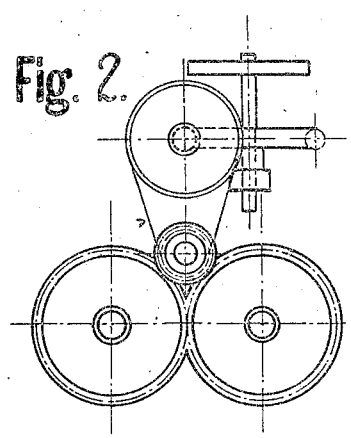
Inventor  
J. Klaus, fils  
By Markoller  
Attys.

Patented Aug. 17, 1926.

1,596,860

UNITED STATES PATENT OFFICE.

JACQUES KLAUS, FILS, OF LE LOCLE, SWITZERLAND, ASSIGNOR TO THE FIRM OF: SOCIÉTÉ ANONYME DES FABRIQUES DE CHOCOLAT ET CONFISERIE, J. KLAUS, LE LOCLE, OF NEUCHATEL, SWITZERLAND.

PROCEDURE FOR THE MANUFACTURE OF CHOCOLATE.

Application filed January 5, 1924. Serial No. 684,626.

It has been ascertained in the manufacture of chocolate that the moment, at which the butter of cacao is put into the paste, exercises a great influence upon the quality of the end-product. On the other hand, the way in which the said butter of cacao is conducted to the paste does also play a part. The quality of the chocolate is favourably influenced, if it is subjected to stirring-up, whilst the paste is operated, so that a heating of the working-paste will take place.

In the procedure of the manufacture of chocolate, according to the present invention, all the hitherto collected experiences are used. It is characterized in that the butter of cacao is added by drops during the working of the paste, when the paste, by means of intensive stirring, has been heated to a certain temperature.

The accompanying drawing represents for an example, and in so much to allow an easy comprehension of the invention, only one form of execution of a machine for carrying the procedure of this invention into effect.

Figure 1 is a view in elevation, partly in section, Figure 2 is an end-view and Figure 3 is a cut through the body of the three-way-cock, which will be described later on.

Referring to the accompanying drawing, $a$ is a basin having double walls, between which a liquid may circulate. In this particular case it is water of variable temperature. In the front-walls of the said basin are mounted two horizontal shafts $b$, one of which is a motor, urging the other to move by means of gearing. The beating sticks $c$ are mounted on the said shafts. They are prismatic and of triangular cut. Between the different groups of shafts walls $d$ are provided, which do not extend over the whole length of the basin and which by this fact allow a communication between the different compartments. The beating-sticks are disposed on the shafts in a way, that whilst the paste is working, the same will not only be stirred very intensively but the friction on the surface of the beating-sticks will be such, that a heating of the working paste will be produced by and by.

The chocolate-dough is poured into a funnel $e$, the bottom of which is occupied by an endless screw, which brings the dough, proportionally according to need, into the first compartment of the machine. Here the dough, at this moment, is heated again by a flow of hot water that comes to it by tube $g$ through valve $h$. This water flows through the space between the walls of the basin and comes out again by tube $f$. Its temperature is therefore by and by transferred over to the basin and the beginning of stirring up of the paste, the consistence is rather firm, is facilitated. Proportionally with the gliding of the paste from one beating-stick to the other, the paste is so well heated, that when it has passed the first compartment and arrives in the second, it has attained the most favourable temperature for receiving the butter of cacao. The entire basin has now that temperature, and means not represented here, are influenced by said temeprature, and operate to slightly open cock $i$ of the recipient in which the butter of cacao is contained. This butter falls drop by drop into the working paste, until the recipient that contains the necessary quantity of butter, is emptied. The mixture-valve of the hot and cold liquids, which is foreseen for maintaining the basin a constant temperature, notwithstanding the heating produced by the intensive churning, is coupled, as is shown in Figure 2, with actuating elements of horizontal shafts $b$. Said valve is therefore rotated very slowly, so that its body of cock $h^1$ is brought from one position, as occupied in Figure 3, on to another position, in which only the cold liquid is allowed to penetrate between the two walls of the basin. The body-cock of the mixture-valve goes through a series of positions, which all correspond with a well determined temperature of the liquid, so, that at the moment of admitting of the quantity of dough inside the funnel $e$ and the quantity of butter in the recipient $k$ is finished up, a constant temperature is maintained inside the basin by means of the mixture-valve.

A very sensible economy in butter of cacao for a given quantity of chocolate is a direct consequence in the application of this procedure.

I claim:—

A process of manufacturing chocolate consisting in gradually feeding the chocolate paste into a chamber, vigorously stirring the chocolate paste so as to heat the same, applying additional heat to the paste and moving the paste along the chamber to a predetermined point, whereby the paste at this point will be raised to a predetermined temperature, then adding at this point cocoa butter drop by drop to the preheated paste, and subsequently vigorously stirring the mixture of paste and cocoa butter, and maintaining the mixture at a constant temperature during the last mentioned stirring.

In testimony whereof I affix my signature.

JACQUES KLAUS, Fils.